(12) United States Patent
Persson

(10) Patent No.: US 8,505,619 B2
(45) Date of Patent: Aug. 13, 2013

(54) HEAT EXCHANGER WITH TEMPERATURE-CONTROLLED VALVE

(75) Inventor: Lars Persson, Abbekas (SE)

(73) Assignees: Sundsvall Energi AB (SE); Danfoss A/S (DK)

( * ) Notice: Subject to any disclaimer, the term of this patent is extended or adjusted under 35 U.S.C. 154(b) by 1161 days.

(21) Appl. No.: 11/662,223

(22) PCT Filed: Sep. 7, 2005

(86) PCT No.: PCT/EP2005/054415
§ 371 (c)(1),
(2), (4) Date: Jun. 13, 2008

(87) PCT Pub. No.: WO2006/027368
PCT Pub. Date: Mar. 16, 2006

(65) Prior Publication Data
US 2008/0257538 A1    Oct. 23, 2008

(30) Foreign Application Priority Data
Sep. 8, 2004  (SE) ........................ 0402153

(51) Int. Cl.
*F28F 3/00* (2006.01)
(52) U.S. Cl.
USPC ............ 165/166; 165/164; 165/300; 165/287
(58) Field of Classification Search
USPC ................. 165/166, 167, 279, 287, 300, 292; 236/99 K; 374/209, 148, 208
See application file for complete search history.

(56) References Cited

U.S. PATENT DOCUMENTS

| | | | |
|---|---|---|---|
| 3,081,631 A * | 3/1963 | Switzer, Jr. ................... | 374/148 |
| 4,595,046 A * | 6/1986 | Iino ............................... | 165/299 |
| 5,121,790 A | 6/1992 | Persson | |
| 5,950,715 A * | 9/1999 | Jonsson et al. ................ | 165/103 |
| 5,992,510 A * | 11/1999 | Kallrot ............................ | 165/78 |

(Continued)

FOREIGN PATENT DOCUMENTS

| | | |
|---|---|---|
| EP | 0608195 A1 | 7/1994 |
| GB | 1014234 | 12/1965 |

(Continued)

OTHER PUBLICATIONS

International Preliminary Report on Patentability in corresponding PCT application No. PCT/EP2005/054415, dated Mar. 22, 2007 (7 pages).

(Continued)

*Primary Examiner* — Marc Norman
*Assistant Examiner* — Devon Russell
(74) *Attorney, Agent, or Firm* — Schwegman Lundberg & Woessner, P.A.

(57) ABSTRACT

The invention relates to a heat exchanger with a temperature sensor and especially a heat exchanger usable for heating hot water using district heating water. The heat exchanger (1) contains plates (2) placed in a pack and brazed together so that 5 separate channels for first (Fj) and second (VV) media are formed between alternate pairs of plates; two pairs of connections for inlet (3) and outlet (4) for the first medium and inlet (5) and outlet (6) for the second medium, respectively; and a temperature sensor (9) connectable to a valve (7) to control supply of the first medium through the heat exchanger. The first medium is intended to supply heat to the second medium. The temperature sensor (9) is placed through a number of plates and in heat conducting contact with them such that the temperature sensor controls the first valve.

21 Claims, 2 Drawing Sheets

(56) References Cited

U.S. PATENT DOCUMENTS

| | | | |
|---|---|---|---|
| 6,062,305 A | 5/2000 | Persson | |
| 6,164,372 A | 12/2000 | Persson | |
| 6,182,749 B1 * | 2/2001 | Brost et al. | 165/297 |
| 6,564,862 B1 * | 5/2003 | Persson | 165/140 |
| 7,213,635 B2 * | 5/2007 | Persson | 165/78 |
| 2004/0134637 A1 * | 7/2004 | Helin et al. | 165/11.1 |
| 2005/0077026 A1 * | 4/2005 | Busch et al. | 165/51 |
| 2006/0048917 A1 * | 3/2006 | Persson | 165/78 |

FOREIGN PATENT DOCUMENTS

| | | |
|---|---|---|
| JP | 10220634 | 8/1998 |
| WO | WO 98/37374 | 8/1998 |
| WO | WO 9837374 A1 * | 8/1998 |
| WO | WO 00/03189 | 1/2000 |
| WO | WO-0142729 A1 | 6/2001 |
| WO | WO-02/070976 A1 | 9/2002 |
| WO | WO-03091651 A1 | 11/2003 |
| WO | WO-2004/040224 A1 | 5/2004 |
| WO | WO-2005/103572 A1 | 11/2005 |

OTHER PUBLICATIONS

"International Search Report for Application No. PCT/EP2005/054415", 1 Page, Dec. 5, 2005.

* cited by examiner

HEAT EXCHANGER WITH TEMPERATURE-CONTROLLED VALVE

FIELD OF THE INVENTION

This invention relates to a heat exchanger with a temperature sensor and in particular a heat exchanger usable for heating hot water using district heating water. The invention provides a heat exchanger intended to be connected to a valve which can be opened and closed rapidly by suitable location and connection of a temperature sensor which controls the valve.

TECHNICAL BACKGROUND

It is previously known that heat exchangers can be used for heating hot water. A special problem in this respect is that the supply of hot water from the district heating system must be shut off rapidly when the tapping of hot water is interrupted. Otherwise there is a risk that the water will be overheated, creating among other things the risk of scalding. The document EP 608195 discloses a solution to this problem. A temperature sensor is located in an immersion tube which is in contact with the water in both the district heating and hot water circuits. However, because the sensor is located in water, less favourable detection of water temperature is achieved. This applies especially at lower flows and particularly with stationary water. Another known problem is oscillation of hot water temperature during tapping. This applies especially during changes in tapping flow. The most common reason for this problem is a too slow temperature detection.

SUMMARY OF THE INVENTION

The present invention provides a solution to the problem by arranging the temperature sensor in metallic heat conducting contact with the plates of the heat exchanger. Heat transmission to the sensor then takes place rapidly, which in turn increases the rate of temperature detection.

The invention therefore refers to a heat exchanger containing: plates placed in a pack and brazed together such that separate channels for a first and a second medium are formed between alternate pairs of plates; two pairs of connections for inlet and outlet for the first and second medium respectively; and a temperature sensor connectable to a first valve to regulate the supply of first medium through the heat exchanger, in which the first medium is intended to transfer heat to the second medium.

In accordance with the invention a temperature sensor is placed in holes through a number of the plates, said holes being provided in plates where ridges meet in the channels for one of the media, such that heat conducting contact is achieved with said plates, the temperature sensor being arranged to control the first valve.

Preferably, the temperature sensor incorporates a bulb that acts mechanically on the first valve.

Suitably, the bulb contains wax with a melting range lying around a predetermined temperature.

BRIEF DESCRIPTION OF THE DRAWINGS

The invention will be described in detail below with reference to the attached drawings, of which.

DETAILED DESCRIPTION OF PREFERRED EMBODIMENTS

Plate heat exchangers are generally known devices for exchange of heat between two different media. Plate heat exchangers are used in many different applications and the present invention is not restricted to any special application, even though the invention has been specially developed as a heat exchanger intended to supply hot water using district heating. The invention is easiest to apply to a plate heat exchanger of all the fully brazed type. In other words, the heat exchanger consists of plates with a pattern of grooves with inlet and outlet connections for two media. Plates are placed in a pack and brazed together to form a single unit. Separate channels are formed for the two media which circulate against each other between alternate pairs of plates. This technology is generally known and will not therefore be described in detail here.

Figure 1:
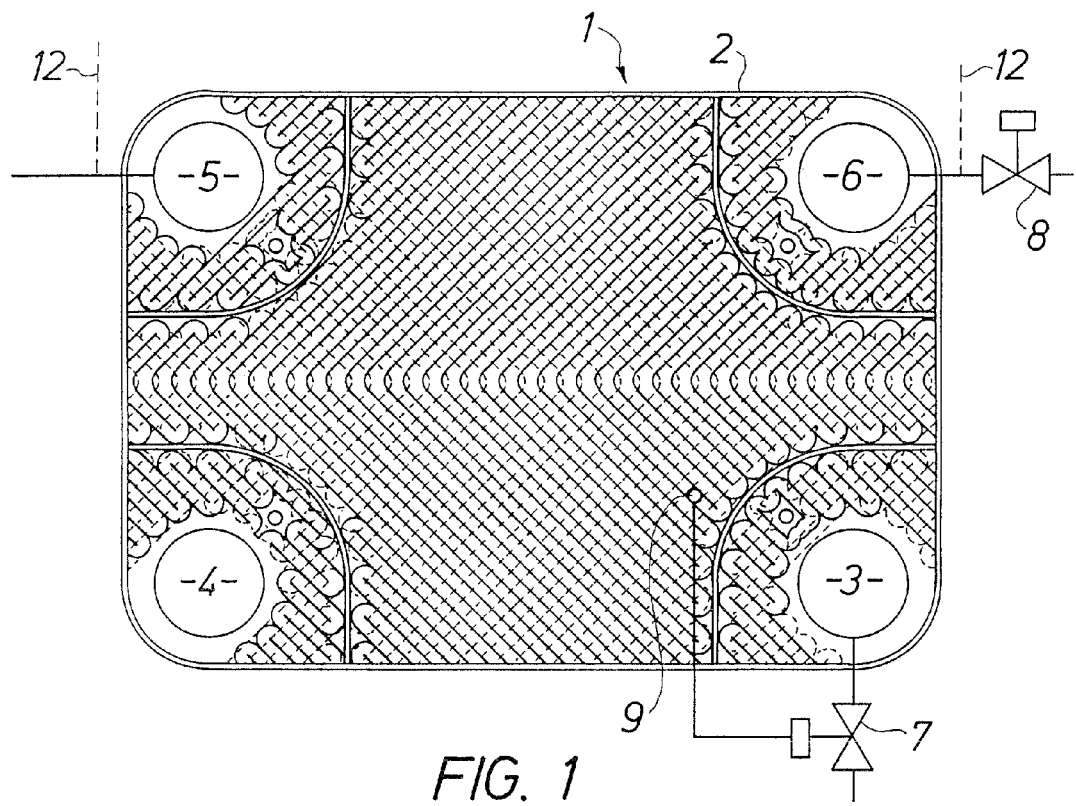
FIG. 1 is a diagrammatic plan view of a heat exchanger according to the invention.

FIG. 1 is a diagrammatic view of a heat exchanger for heating water using hot water from a district heating network. The heat exchanger 1 has plates 2 with two pairs of connections. One pair of connections consists of an inlet 3 and an outlet 4 for district heating water Fj. The second pair consists of an inlet 5 and an outlet 6 for hot water VV. A conventional hot water circulation system 12 can be connected to the hot water system as shown by the dotted line. It will be appreciated that the hot water is actually cold or at least at a lower temperature at inlet 5 and is heated in the heat exchanger as it passes through to the outlet 6.

The supply of district heating water is controlled by a valve 7 which is preferably mounted in the district heating water feed line to the heat exchanger 1, as shown, or in the district heating water return line from the heat exchanger 1. The valve 7 can alternatively be built into the heat exchanger 1. Opening and closing of the valve 7 is controlled by a thermostatic function that includes a temperature sensor 9, which will be explained in further detail below, and an actuator capable of opening and closing the valve 7. The tapping of hot water is controlled in the usual manner using at least one valve 8. The valve 8 is usually external and not part of the heat exchanger, typically a number of hot water taps located at various points in a building.

The incoming district heating water is usually at a temperature of about 100° C. This temperature can be higher or lower depending on outdoor temperature, design data for the current district heating system, and other factors. The district heating water should flow through the heat exchanger, either continuously when tap 8 is open or if any connected hot water circuit 12 is operating to heat the hot water, or intermittently if the hot water circuit 12 is absent or not in operation, and when the tap 8 is closed, to cause heat retention of the hot water in the heat exchanger, so that even in this case there is direct access to hot water when the tap 8 is opened. On the other hand it is important that the district heating valve 7 responds directly to temperature changes in the hot water and closes quickly when the tap 8 is closed. If the district heating valve 7 stays open for too long, the water may be overheated more or less dangerously depending on how rapidly the district heating valve 7 closes. If the tap 8 is then opened again, there is a risk of scalding. Normally, the outlet hot water should never have a temperature higher than about 55° C. Delayed closing of the valve 7 also causes increased energy consumption and can cause problems with lime deposits in the heat exchanger.

Figure 2:
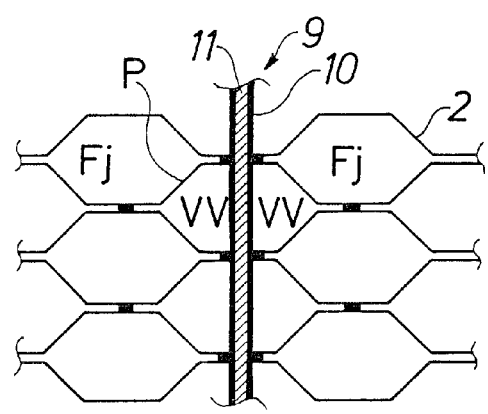
FIG. 2 is a cross-sectional view of a number of plates with a temperature sensor according to the invention.

FIG. 2 shows a temperature sensor 9 designed according to the present invention. The temperature sensor 9 is placed through a number of plates 2. This is made possible by holes provided in the plates, preferably where ridges meet in channels for the district heating water. The temperature sensor has a very good, practically direct metallic, heat conducting contact with the plates and is surrounded by the hot water VV (i.e. the medium to be heated) while the channels for the district heating water Fj are at a certain small distance from the sensor 9 depending on the width of the ridges. The sensor is placed in the heat exchanger near the inlet 3 of the district heating water Fj. Thus, it is affected before the hot water has left the heat exchanger.

For the design of holes through a heat exchanger, see publications WO 98/37374 and WO 00/03189.

The sensor can be pressed or brazed directly to the plates 2 or can be located in a tube 10 which is itself pressed or brazed to the plates. The latter variant means that the temperature sensor is detachable from the heat exchanger and can be replaced easily.

Heat transfer from metal plates to a sensor is about seven times faster than heat transfer to a sensor from stationary water. The temperature detection is thus also correspondingly faster compared with the prior art.

Various types of temperature sensors are previously known and can be used in the present invention. In the present invention it is proposed that the temperature sensor has a (sensor body) bulb 11 containing some medium that changes in volume or pressure with changes in temperature, e.g. as with the preferred wax or paraffin (or glycerine). Valves with this type of temperature sensor are previously known, e.g. in the form of thermostatic valves in ordinary radiators for water-based heating systems. When the bulb is heated, the wax melts and takes up a greater volume. In a preferred embodiment, the volume increase of the wax is 19% when the wax melts. The bulb is hydraulically and mechanically connected to the valve 7 and the expanded volume closes the valve 7. When the wax cools, it solidifies again and takes up less volume. A spring biasing the valve 7 then opens the valve 7. Suitably, the wax is a mixture of various paraffins with somewhat different melting points, which means that the wax will have a melting range between the completely solid and liquid forms. The mix is chosen so that the valve reacts at a predetermined temperature T, eg about 55° C. (or 53° C.), and the melting range should be fairly small, eg a melting range of $\Delta T=0.7°$ C. Within this melting range from T to $T+\Delta T$, the valve 7 is open to a greater or lesser extent. At temperatures below the melting range, the valve is therefore completely open, while above the melting range it is completely closed.

The volume increase of the wax is conveyed by means of hydraulic liquid through a capillary tube to the actuator. In the actuator, a plunger is moved which acts on the valve 7. It should be noted that the wax is incompressible and thus is not affected by pressure. Thus, the actuator of the valve is controlled by volume and not pressure. Because of this fact the control is not influenced by pressure variations in the district heating water system.

Figure 3:
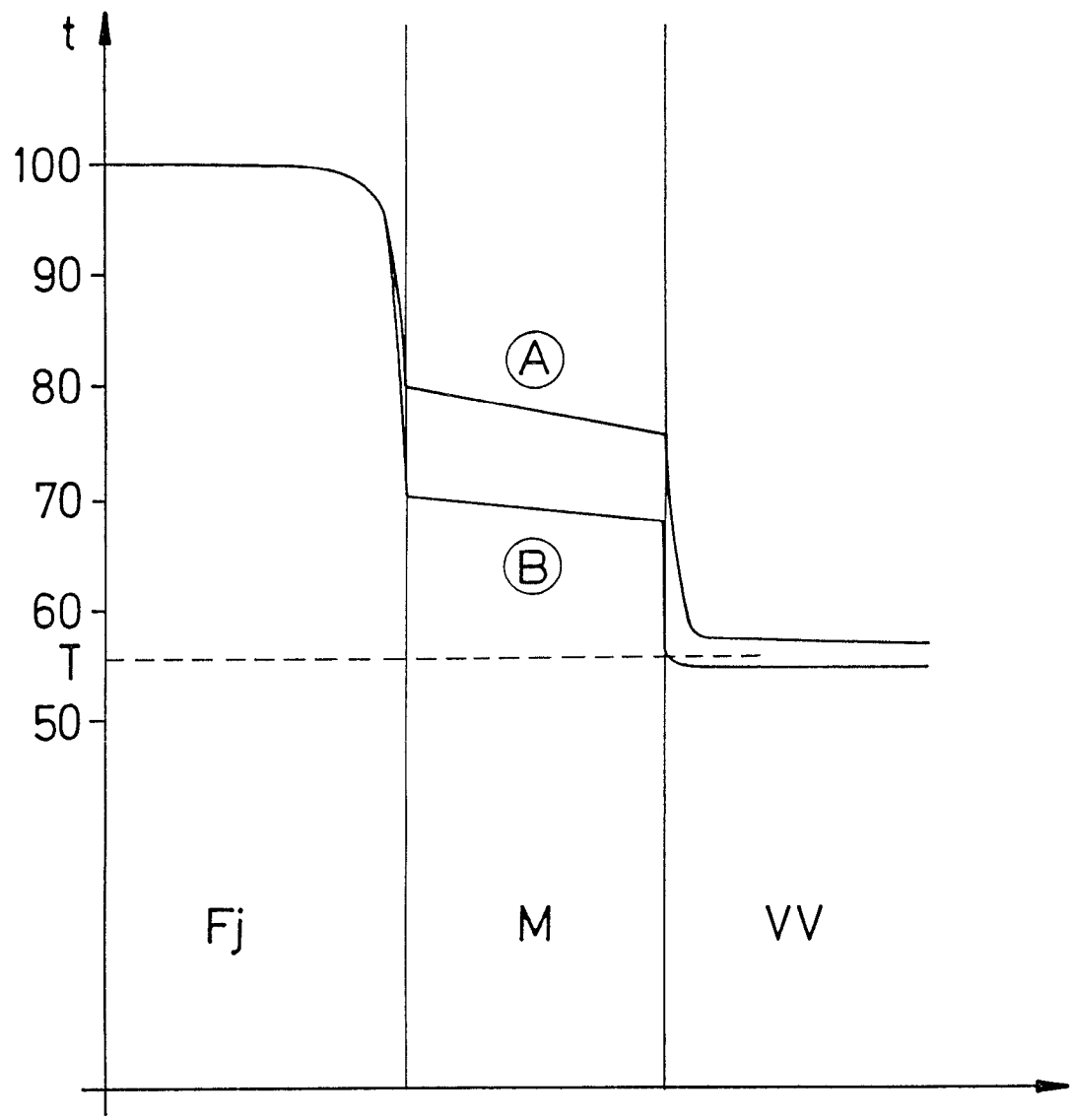
FIG. 3 is a temperature diagram representing two operational cases.

FIG. 3 shows a temperature diagram of two operational cases with a heat exchanger according to the invention. The diagram is representative of the temperature e.g. at point P in FIG. 2. At the left of the diagram is shown the temperature in the district heating circuit Fj, at the centre the temperature in the metal plate, designated as M in FIG. 3, and at the right the temperature in the hot water circuit VV. The temperature sensor 9 is located in metallic contact on the hot water side and the temperature t of the sensor closely follows the temperature on the right side of the metal wall in FIG. 3. This effect is reinforced because sensor 9 is located in the hot water channels VV and the district heating water Fj circulates at a given distance due to the location of the sensor in the ridges of the district heating water channels.

The first operational case is the situation in which the hot water tap 8 is closed, and shown on the upper temperature curve A. We assume that the tap 8 has just closed and that no hot water circuit 12 is in operation. The district heating water Fj is still warm. On the hot water side, there is no flow so that a laminar condition occurs. This has a high thermal resistance, so that the temperature in the metal wall and in the hot water close to this rapidly increases, for example to approx 76° C., i.e. significantly higher that the predetermined temperature T. This is also the temperature t of the temperature sensor. Thus, the wax in the bulb is melted and has closed the district heating valve 7. Note that the actual hot water VV heats up considerably more slowly and does not reach a temperature significantly higher than T.

If the hot water tap 8 remains closed over a longer period, the temperature curve A falls and levels out (not shown). When the temperature t in the bulb falls below $T+\Delta T$, the wax begins to solidify and the district heating valve starts to open. The hot water is then heated. When the hot water temperature and thus the temperature t of the sensor rise above $T+\Delta T$, the district heating valve 7 closes completely again. Since the valve starts to open as soon as the wax has dropped below the temperature $T+\Delta T$, this feature acts as an automatic heat retention function, while at the same time guaranteeing a short response time of the hot water. In this way heat retention of the hot water at around the temperature T is achieved.

On the other hand, if the hot water valve 8 is opened (or the hot water circuit 12 circulates the hot water VV) there is a faster process. The lower temperature curve B in FIG. 3 shows the situation with open hot water tap 8. When the hot water tap 8 is opened, turbulent flow occurs in the hot water, which rapidly cools the metal plates, especially at the adjoining ridges, in other words at such a position where the temperature sensor 9 is located. The cooling typically does not take more than 2 seconds. The temperature t in the sensor bulb 9 falls below temperature T and the wax solidifies completely, causing district heating valve 7 to open. The temperature curve then quickly appears as in B.

This situation prevails until the hot water tap 8 closes (or the hot water circuit 12 stops). Then the hot water flow suddenly becomes turbulent, and the thermal resistance of the hot water increases so that the metal is rapidly heated. The hot water is heated considerably more slowly but the temperature sensor 9 primarily detects the temperature of the metal. So the bulb 11 heats rapidly to above the temperature $T+\Delta T$, and the district heating valve 7 is completely closed. In this way no overheating of the hot water occurs. After a while the temperature is as in the upper temperature curve A.

For best function, the sensor 9 should be located as near as possible to the district heating inlet 3. The asymmetrical location of the sensor means that double tools advantageously should be used when manufacturing the plates. As an alternative, the temperature sensor outlet can provided rotationally symmetrical both at the top and bottom of the heat exchanger. Only one outlet is used for the temperature sensor while the other can be empty. In addition, the district heating water should flow in the opposite direction to the hot water.

The temperature sensor can be arranged through the whole heat exchanger pack or only through a lesser number of plates.

The control according to the invention operates as a thermal PID controller. The proportionality action is obvious; with a water temperature higher than the temperature T, there is an increased melting resulting in that the wax is expanded. The integration action is determined by the ratio of melted wax to solid phase. If the melting heat is 160 kJ/kg, this corresponds to an energy value of approximately 40° C. temperature change. This means that the volume of the wax is not defined for the temperature T. Thus, when the surrounding temperature is around the temperature T, there is no change of volume. At surrounding temperatures lower than the temperature T the wax sludge begins solidify without changing the temperature of the wax. Only when the wax has solidified completely, the temperature of the wax begins to change. In contrast, the derivative action has got nothing to do with the wax. The derivative action is obtained by locating the sensor with the wax close to the inlet of the district heating water. This means that when the valve opens more, there is a temperature increase in the material surrounding the wax faster than the temperature increase in the water.

A person skilled in the art will understand that the heat exchanger design can be varied in terms of number of plates and different ridge patterns, heat exchanger connections and valves, etc. The scope of the invention is limited only by the following claims.

The invention claimed is:

1. A heat exchanger comprising: at least two plates placed in a pack and brazed together so that separate channels for a first medium and a second medium are formed between alternate pairs of plates; two pairs of connections for inlet and outlet of the first medium and inlet and outlet for the second medium, respectively; and a temperature sensor connectable to a first valve to control the supply of the first medium through the heat exchanger, the first medium being intended to supply heat to the second medium; the temperature sensor distinct from the plates and connectable to the plates with placement of the temperature sensor within holes through a number of plates, said holes being provided in plates where ridges meet in the channels for at least one of the first medium and the second medium, such that heat-conducting contact is achieved between the temperature sensor and said plates, wherein the temperature sensor is arranged to control the first valve, wherein the first and second media are arranged to flow in opposite directions, wherein the temperature sensor is placed on that part of the heat exchanger where the inlet for the first medium and outlet for the second medium are located, and wherein the temperature sensor is located proximate, but outside, the inlet for the first medium, the temperature sensor being located closer to the inlet for the first medium than to the outlet for the second medium.

2. A heat exchanger according to claim 1, wherein the temperature sensor is secured to the plates.

3. A heat exchanger according to claim 2, wherein the temperature sensor is at least one of brazed or pressed to the plates.

4. A heat exchanger according to claim 1, wherein the temperature sensor is detachably located in a tube which is itself secured to the plates.

5. A heat exchanger according to claim 4, wherein the tube is at least one of brazed or pressed to at least one of the plates.

6. A heat exchanger according to claim 1, wherein the temperature sensor is placed so that the temperature sensor is disposed within and surrounded by channels for the second medium and in heat-conducting contact with the channels for the first medium via said plates.

7. A heat exchanger according to claim 1, wherein the temperature sensor contains a bulb which mechanically affects the first valve.

8. A heat exchanger according to claim 7, wherein the bulb contains wax such that the first valve is arranged to close when the wax is melted and to open when the wax is solidified.

9. A heat exchanger according to claim 8, wherein the wax has a melting range around a set temperature T.

10. A heat exchanger according to claim 9, wherein the temperature T is approximately 55° C.

11. A heat exchanger according to claim 9, wherein the wax includes a wax melting range of approximately 0.7° C.

12. A heat exchanger according to claim 9 wherein the wax includes a melting heat of 160 kJ/kg.

13. A heat exchanger according to claim 1, wherein the temperature sensor is arranged to open the first valve completely when the temperature sensor detects a temperature decrease and that the detected temperature t is lower than a predetermined temperature T; and wherein the temperature sensor is arranged to close the first valve completely when the temperature sensor detects a temperature increase and the detected temperature t is higher than a higher temperature T+ΔT.

14. A heat exchanger according to claim 1, wherein the inlet and the outlet for the first medium are arranged to be connected to a district heating network and the inlet and the outlet for the second medium are arranged to be connected to a hot water circuit which contains at least one second valve to control supply of the second medium through the heat exchanger.

15. A heat exchanger according to claim 14, wherein the heat exchanger is arranged to be connected to a hot water circuit which also contains a hot water-circulation system.

16. A heat exchanger, comprising:
  at least two plates positioned in a pack and fixed together to form separate channels for a first medium and a second medium between alternate pairs of plates, wherein a number of the plates including holes therein;
  an inlet and an outlet of the first medium associated with the channel for the first medium;
  an inlet and an outlet for the second medium associated with the channel for the second medium; and
  a temperature sensor operably connectable to a first valve to control the supply of the first medium through the heat exchanger, the first medium being intended to supply heat to the second medium, the temperature sensor being distinct from the plates and connectable to the plates with placement of the temperature sensor within the holes through the number of plates, said holes being provided in plates where ridges meet in the channels for the second medium, such that the temperature sensor is disposed within and surrounded by the channels for the second medium and in heat-conducting contact with the channels for the first medium via said plates, wherein the temperature sensor is to control the first valve, wherein the temperature sensor is positioned to be surrounded by channels for the second medium, wherein the channels and the respective inlets and outlets for the first medium and the second medium are configured to flow the first medium and the second medium in opposite directions, wherein the temperature sensor is placed at the inlet for the first medium and the outlet for the second medium, and wherein the temperature sensor is located proximate, but outside, the inlet for the first medium, the temperature sensor being located closer to the inlet for the first medium than to the outlet for the second medium.

17. The heat exchanger of claim 16, wherein the temperature sensor includes a bulb configured to mechanically interact with the first valve; wherein the bulb includes a wax such that the first valve is arranged to close when the wax is melted and to open when the wax is solidified; wherein the wax has a melting range around a temperature T of approximately 55° C.; and wherein the wax includes a wax melting range of approximately 0.7° C.

18. A heat exchanger according to claim 13, wherein the temperature sensor is configured to start to open the first valve when the temperature sensor detects a temperature decrease and that the detected temperature t is within the range from the temperature T to the temperature T+ΔT.

19. A heat exchanger according to claim 18, wherein the temperature sensor is configured to start to close the first valve when the temperature sensor detects a temperature increase and the detected temperature t is within the range from the temperature T to the temperature T+ΔT.

20. The heat exchanger of claim 16, wherein the temperature sensor is configured to start to open the first valve when the temperature sensor detects a temperature decrease and that the detected temperature t is within the range from the temperature T to the temperature T+ΔT,
the temperature sensor being configured to start to close the first valve when the temperature sensor detects a temperature increase and the detected temperature t is within the range from the temperature T to the temperature T+ΔT.

21. A heat exchanger comprising:
at least two plates placed in a pack and brazed together so that separate channels for a first medium and a second medium are formed between alternate pairs of plates;
two pairs of connections for inlet and outlet of the first medium and inlet and outlet for the second medium, respectively; and
a temperature sensor connected via a capillary tube to a first valve configured to control the supply of the first medium through the heat exchanger, the first medium being intended to supply heat to the second medium, the temperature sensor distinct from the plates and connectable to the plates with placement of the temperature sensor within holes through a number of plates, said holes being provided in plates where ridges meet in the channels for at least one of the first medium and the second medium, such that heat-conducting contact is achieved between the temperature sensor and said plates, wherein the temperature sensor is placed so that the temperature sensor is disposed within and surrounded by the channels for the second medium and in heat-conducting contact with the channels for the first medium via said plates, wherein the temperature sensor is arranged to control the first valve, wherein the first and second media are arranged to flow in opposite directions, wherein the temperature sensor is placed on that part of the heat exchanger where the inlet for the first medium and outlet for the second medium are located, and wherein the temperature sensor is located proximate, but outside, the inlet for the first medium, the temperature sensor being located closer to the inlet for the first medium than to the outlet for the second medium, wherein the temperature sensor includes a wax within the temperature sensor, the wax configured to change volume with a change in temperature, the first valve configured to be actuated with a change in volume of the wax, the change of volume being conveyed to the first valve using a hydraulic liquid within the capillary tube.

* * * * *

UNITED STATES PATENT AND TRADEMARK OFFICE
CERTIFICATE OF CORRECTION

| | | |
|---|---|---|
| PATENT NO. | : 8,505,619 B2 | Page 1 of 1 |
| APPLICATION NO. | : 11/662223 | |
| DATED | : August 13, 2013 | |
| INVENTOR(S) | : Persson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1719 days.

Signed and Sealed this
Second Day of June, 2015

Michelle K. Lee
*Director of the United States Patent and Trademark Office*